United States Patent [19]

Lee

[11] 4,193,884

[45] Mar. 18, 1980

[54] AMINE DERIVATIVES OF NITROSATED HIGH MOLECULAR WEIGHT ALKYL-SUBSTITUTED PHENOL, AND COMPOSITIONS CONTAINING THE SAME

[75] Inventor: Richard J. Lee, Downers Grove, Ill.

[73] Assignee: Standard Oil Company (Indiana), Chicago, Ill.

[21] Appl. No.: 884,840

[22] Filed: Mar. 9, 1978

[51] Int. Cl.$^2$ .............................................. C10M 1/34
[52] U.S. Cl. .......................... 252/51.5 R; 252/51.5 A; 260/570.5 P
[58] Field of Search ..................... 252/51.5 R, 51.5 A; 260/570.5 P

[56] References Cited

U.S. PATENT DOCUMENTS

| 3,346,491 | 10/1967 | Giammaria et al. | 252/51.5 R |
| 3,380,918 | 4/1968 | Anderson | 252/51.5 R |
| 3,445,531 | 5/1969 | Anderson | 252/51.5 R |
| 3,576,742 | 4/1971 | Honnen et al. | 252/51.5 R |
| 4,022,700 | 5/1977 | Harris | 252/51.5 A |

OTHER PUBLICATIONS

Hays et al. J. Org. Chem. 32 (1967) pp. 158–162.

*Primary Examiner*—Arthur P. Demers
*Attorney, Agent, or Firm*—William H. Magidson; Arthur G. Gilkes; William T. McClain

[57] ABSTRACT

High molecular weight alkylated phenols, in which the alkyl substituent has an average molecular weight of from about 300 to about 100,000 are nitrosated with nitrous acid anhydride gas, in the presence of an acid catalyst, and the nitrosated product reacted with an amine compound having at least one HN< group to obtain oil-soluble amine derivatives of such nitrosated alkylated phenols suitable as lubricating oil additives having dispersancy properties.

15 Claims, No Drawings

AMINE DERIVATIVES OF NITROSATED HIGH MOLECULAR WEIGHT ALKYL-SUBSTITUTED PHENOL, AND COMPOSITIONS CONTAINING THE SAME

BACKGROUND OF THE INVENTION

This invention relates to improved lubricating oil compositions, and particularly relates to internal combustion engine lubricating oil formulations containing a minor amount of a new class of oil-soluble addition agents which improve the performance of the oil, particularly its detergency property.

Various additives have been developed for the purpose of imparting detergency and/or dispersancy properties to lubricating oils. Neutral and over-based metallo-organic compounds, such as the alkaline earth metal salts of sulfonic acids, and of hydrocarbon-$P_2S_5$ reaction products were the first additives used for such purposes.

As performance levels increased and the recommended periods between oil drains lengthened for internal combustion engines, more efficient additives were needed. When high molecular weight polybutene polymers became commercially available in the early 1940's, a series of polybutene-phosphorus pentasulfide reaction products, e.g., alkaline earth salts, amine and alkylene oxide derivatives, were developed, in which the high molecular weight polybutene group enhanced their effectiveness. Other proposed additives were the amine salts, amides, imides and amidines of polybutenyl-substituted polycarboxylic acids and polymeric compounds having pendant or grafted-on polar groups. Also suggested, were combinations of alkaline earth metal sulfonates and Mannich condensation products of a low molecular weight alkyl ($C_2-C_{20}$) substituted hydroxy aromatic compound, an amine and an aldehyde, and alkaline earth salts (phenates) of such Mannich condensation products.

Mannich condensation products derived from alkyl-substituted hydroxyaromatic compounds having low molecular weight alkyl substituents are described in U.S. Pat. Nos. 2,403,453; 2,353,491; 2,363,134; 2,459,112; 2,984,550; 3,036,003, and others. However, none of such prior products are suitable for use as detergent and/or dispersant additives for present day long drain oil interval in-service use.

Subsequent to the Mannich condensation products prepared with low molecular weight alkyl-substituted hydroxyaromatic compounds, e.g., alkyl phenols, lubricating oil additives were prepared by the Mannich condensation reaction in which a high molecular weight alkyl-substituted hydroxyaromatic compound, e.g. alkyl phenol, whose alkyl-substituent has an average molecular weight in the range of about 600–3,000, is reacted with an amine and formaldehyde. United States Patent No. 3,368,972 describes such products as dispersant-detergent addition agents for lubricating oils.

BRIEF SUMMARY OF THE INVENTION

The new class of compounds which comprise the present invention are oil-soluble amine derivatives of nitrosated high molecular weight alkyl-substituted phenols. Such compounds are prepared by reacting, at a temperature of from about 160° F. to about 340° F., a nitrosated alkylated phenol, in which the alkyl substituent has a molecular weight of about 300–100,000, or more, with an amine compound having at least one HN< group, in the molar proportions of from about 0.15 to about .50 moles of the nitrosated alkyl phenol and from about 1.0 to about 0.5 moles of the amine or polyamine depending on nitrogen content. The reaction can be carried out in the absence of a diluent or solvent, however, it is preferred to conduct the reaction in the presence of an easily removed organic solvent or diluent, e.g., benzene, xylene, toluene, hexane, and the like, or in the presence of a low viscosity hydrocarbon oil, such as, for example, a 5W petroleum lubricating oil.

The following representative reactants are employed in the preparation of the amine derivatives of high molecular weight alkyl-substituted phenols of the present invention:

(a) -High Molecular Weight Alkyl-substituted Phenols

Representative of these high molecular weight alkyl-substituted phenols are polypropylphenol, polybutylphenol and other polyalkylphenols, in which the alkyl substituent has an average molecular weight of from about 300 to about 100,000, or more, preferably from about 500 to about 3,000. Such polyalkylphenols may be obtained by the alkylation, in the presence of an alkylating catalyst, such as $BF_3$, of phenol with high molecular weight polypropylene, polybutylene and other polymers of $C_2$ to $C_5$ olefins. The preparation of such alkyl-substituted phenols, using a $BF_3$ catalyst, is well known in the art.

The high molecular weight alkyl-substituents on the phenol may be derived from high molecular weight polypropylenes, polybutylenes and other polymers of $C_2-C_5$ mono-olefins, principally 1-mono-olefins. Also useful are copolymers of mono-olefins with monomers copolymerizable therewith wherein the copolymer contains at least 90%, by weight, of the mono-olefin units.

(b) Nitrosated Alkyl-substituted Phenol

The polymer-alkylated phenol, of the type described in (a) above, are nitrosated by reaction with nitrous acid anhydride, in a non-aqueous media, preferably in the presence of an acid catalyst, such as, for example, 98% sulfuric acid, at a temperature of about 70°–90° F. The acid catalyst may be employed in amounts of from about 0.5% to about 1.0%, based on total volume of reactants and solvent. The preferred method is to treat the polymer alkylated phenol, in a hydrocarbon solvent or diluent, e.g., hexane, with small incremental additions of liquid nitrous acid anhydride ($N_2O_3$), in the presence of the acid catalyst. The amount of reactants used may range from about 1–1.5 moles of the alkylated phenol to each mole of the liquid nitrous acid anhydride. After completion of the reaction, usually in about 2–6 hours, the reaction mass is purged with nitrogen to remove excess dissolved gases, and the purged product filtered.

(c) Amino Reactants

Representative of this class of reactants are those having at least one active hydrogen atom on a nitrogen atom; such HN< group-containing reactants can contain only primary or only secondary amino groups or both primary and secondary amino groups. Preferred for the purpose of this invention are the alkylene polyamines and alkyl amines. Such amines include mono- and di-butylamines, cyclohexylamine, ethylenediamine, diethylene triamine, triethylene tetramine, tetraethylene pentamine, heptaethylene octamine, octamethylene diamine; the corresponding propylene polyamines, and other alkylene polyamines of the formula H$_2$N-(A-NH-)$_n$H in which A is a divalent alkyl hydrocarbon radical of 2 to 6 carbon atoms and n is an integer of from 1 to 10; and the urea or thioureau derivatives of such alkylene polyamines as are obtained as condensation products of x mole of urea of thiourea with 2x moles of the alkylene polyamines. Such condensation products can be illustrated in one product form as the linear product of the formula

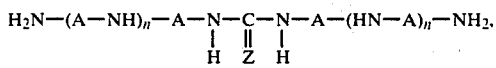

wherein A and n have the meaning above stated, and Z is oxygen or sulfur. Such condensation products are referred to hereinafter as "uramines".

The herein described reaction products of the present invention are effective in imparting dispersancy properties to oleaginous lubricant compositions when used in amounts of from about 0.1% to about 10%. Suitable lubricating oils are mineral hydrocarbon oils, i.e., petroleum oils, synthetic lubricating oils, such as those obtained by the polymerization of hydrocarbons, and other well-known synthetic lubricating oils, and lubricating oils of animal or vegetable origin. Concentrates of a suitable oil base containing more than 10%, i.e., from about 10% to about 70%, or more, of the product of the present invention, alone, or in combination with other well-known lubricating oil additives, can be used for blending with lubricating oils in proportion desired for particular conditions or use.

PREFERRED EMBODIMENT OF THE INVENTION

The examples given below are illustrative of the preferred embodiment of the present invention:

EXAMPLE 1

(a) Preparation of o-nitroso polybutylphenol 600 grams of a polybutylphenol, in which the polybutyl substituent has an average molecular weight of about 2200, in 5W petroleum oil at a 43% concentration (equivalent to about 0.16 mol) were diluted with 400 ccs. of hexane. Under rapid agitation 5 ccs. of 98% concentrated sulfuric acid were added. This solution was treated with nitrous acid anhydride gas for 85 minutes. The rate of the nitrous acid anhydride gas flow was adjusted so that within the period of addition about 0.3 mole of the nitrous acid anhydride was absorbed. The reaction was conducted at room temperature and purged with nitrogen at room temperature after completion of the reaction to remove nitrogen dioxide gas by-product. Analysis of the recovered nitroso product gave 0.94% nitrogen.

(b) Amino derivative of (a)

The nitroso polybutylphenol of (a), above, was treated in toto with 60 ccs. (about 1 mole) of ethylene diamine at a temperature of 180° F. for three hours, and then 7 grams of calcium hydroxide in alcohol added. The mixture was stripped at 250° F. and filtered to remove calcium sulfate. The recovered amino product was 45% active and contained 1.49% nitrogen.

EXAMPLE II (a) Preparation of o-nitroso polypropylphenol

To 320 grams of a 56% concentrated polypropylphenol in a 5W petroleum oil, in which the polypropyl substituent had an average molecular weight of 1165, (equivalent to about 0.15 mole) was added hexane so that the viscosity was reduced sufficiently for the addition of nitrous acid anhydride gas (N$_2$O$_3$). The hexane was treated with the said gas for a period of 210 minutes at room temperature. About a total of 0.3 mole of the gas was absorbed. After the nitrosation reaction, the product was purged with nitrogen, and filtered to remove by-products. The recovered desired o-nitroso polypropylphenol gave a nitrogen content of 1.59%.

(b) Amino derivative of (a)

The o-nitroso polypropylphenol, recovered in (a) above, was heated with excess ethylene diamine at a temperature of about 300° F. for a period of 3 hours, and then stripped of excess ethylene diamine. The recovered product, unfiltered showed an activity of 78%.

EXAMPLE III (a) Nitrosation of polybutylphenol 1805 grams (about 0.5 mole) of a polybutylphenol, in which the polybutyl substituent had an average molecular weight of about 2200, were diluted with hexane and treated with N$_2$O$_3$ gas in the presence of 10 ccs. of 98% sulfuric acid under rapid agitation, at room temperature, for a period of 180 minutes. The amount of N$_2$O$_3$ gas was regulated so that in the reaction period about 1 mole of the gas was added. The nitrosated product was purged with nitrogen until all dissolved gases were dispelled.

(b) Amino derivative of product (a)

The entire batch of the product from (a) above, was reacted with 100 grams of pentaethylene hexamine (about 0.5 mole) at 250° F. for two hours. The product was washed with water and alcohol to remove sulfuric acid salts and water-soluble by-products. The recovered product was 40% active and analyzed 0.85% nitrogen.

EXAMPLE IV (a) Nitrosation of polypropylphenol 700 grams (about 0.5 mole) of a polypropylphenol, were dissolved in 500 ccs. of hexane, and 5 ccs. of 98% sulfuric acid added to the solution. Under rapid agitation nitrous acid anhydride (N$_2$O$_3$) gas was introduced for three hours. The rate of nitrosation was so controlled that a total of one mole of the N$_2$O$_3$ gas was added during the three hour reaction period; the temperature was ambient, ranging from room temperature to 100° F. The product, unwashed, was filtered three times through celite. The recovered product analyzed 2.16% nitrogen.

(b) Amino derivative of product (a)

To the product obtained in (a), above, was added 100 grams (about 0.25 mole) of an uramine, which was the condensation product of 0.5 mole of pentaethylene hexamine and 0.25 mole of urea, and the mixture diluted with 400 grams of a 5W petroleum oil. The reaction mixture was heated to 300° F. and maintained at such temperature for 2 hours. The resultant product after filtration through Celite was 44% active.

EXAMPLE V (a) Nitrosation of polybutylphenol 700 grams (about 0.5 mole) of a polybutylphenol, in which the polybutyl substituent had an average molecular weight of about 2200, were dissolved in 500 ccs. of hexane, and 5 ccs. of 98% sulfuric acid added to the solution. Under rapid agitation nitrous acid anhydride ($N_2O_3$) gas was introduced for three hours. The rate of nitrosation was so controlled that a total of one mole of the $N_2O_3$ gas was added during the three hour period; the temperature ranged from room temperature to 100° F. The reaction product was distilled to remove hexane and dissolved gases.

(b) Amino derivative of product (a)

To the product obtained in (a), above, was added 120 grams of the uramine used in Part (b) of Example IV, above, and the mixture diluted with 400 grams of a 5W petroleum oil. The diluted mixture was heated at 280° F. for four hours and then filtered through Celite. The recovered filtrate was 45% active.

EXAMPLE VI (a) Nitrosation of polybutylphenol

A polybutylphenol in which the polybutyl substituent had an average molecular weight of about 2200, was nitrosated as in Example I, above, to obtain a product containing 0.82% nitrogen.

(b) Amino derivative of product (a)

The product obtained in (a), above, in the amount of about 0.5 mole, was treated with 120 grams (in slight excess of 0.5 mole) of pentaethylene hexamine at 280° F. for two hours. The product was then diluted with 450 grams of 5W petroleum oil, and the diluted product treated with 15 grams (0.25 mole) of urea to form the uramine. The product was then purged at 300° F. with nitrogen to remove all ammonia, and then filtered through Celite. The filtrate was then extracted with isopropyl alcohol to obtain 64.5% of a dispersant product, and 23% of a low molecular weight product. The desired extracted dispersant material had a nitrogen content of 0.92%.

The dispersancy effectiveness of the additives of the present invention is demonstrated by the so-called Spot Dispersancy Test. In this test, a measured amount of the additive to be tested is mixed with a measured volume of crankcase lubricant oil formulation which has been used in a Lincoln Sequence V engine test for 394 hours (twice the time of the standard test time). This composition is heated and stirred at about 300° F. for about 16 hours, and an aliquot is transferred to blotting paper. A control is made at the same time by stirring and heating at 300° F. for 16 hours a second oil from the 394 Lincoln Sequence V engine test, and depositing an aliquot on blotting paper. At the same time a readily available commercial ashless dispersant additive is mixed in the same manner as above, for comparison purposes. The deposits on the blotting paper are measured to obtain the average diameter of the inner oil ring (Do), and the average diameter of the inner sludge ring (Da). The ratio of Da/Do is an indication of the detergent-dispersant property of the addition agent.

The data in Table I, below, demonstrate the effectiveness of the products of the present invention as dispersants in lubricants. The following samples were employed in this test:

Sample A—Control Oil; no dispersant
Sample B—Control Oil plus 0.8% (2 grams of a 40% active product) of the product of Example I, part (b)
Sample C—Control Oil plus 0.8% of the product of Example II, part (b)
Sample D—Control Oil plus 0.8% of the product of Example III, part (b)
Sample E—Control Oil plus 0.8% of the product of Example IV, part (b)
Sample F—Control Oil plus 0.8% of the product of Example V, part (b)
Sample G—Control Oil plus 0.8% of the product of Example VI, part (b)

TABLE I

| SAMPLE | PERCENT DISPERSANCY |
| --- | --- |
| A | 47 |
| B | 54 |
| C | 53 |
| D | 62 |
| E | 52 |
| F | 57 |
| G | 79 |

The above data show the effectiveness of the compounds of the present invention as dispersants in lubricating oil compositions.

Percentages given herein and in the appended claims are weight percentages unless otherwise stated.

Although the present invention has been described with reference to certain specific preferred embodiments thereof, it is not limited thereto, but includes within its scope such modifications and variations as come within the scope and spirit of the appended claims.

I claim:

1. The oil-soluble product prepared by the process comprising, nitrosating, with nitrous acid anhydride gas in the presence of an acid catalyst, an alkyl-substituted phenol, wherein the alkyl-substituent has an average molecular weight of from about 300 to about 100,000, and reacting, from about 0.15 moles to about 0.5 moles of the resultant nitrosated alkyl-substituted phenol with from about 1.0 moles to about 0.5 moles of an amine compound having at least one amino group selected from the class consisting of primary amino and secondary amino.

2. The oil-soluble product of claim 1, wherein the alkyl-substituted phenol is a polybutyl-substituted phenol in which the polybutyl substituent has an average molecular weight of from about 500 to about 3,000.

3. The oil-soluble product of claim 1, wherein the alkyl-substituted phenol is a polypropyl-substituted phenol in which the polypropyl substituent has an average molecular weight of from about 500 to about 3,000.

4. The oil-soluble product of claim 1, wherein the amine compound is an alkylene polyamine having the general formula:

$$H_2N\text{-}(A\text{-}NH\text{-})_nH,$$

in which A is a divalent alkyl hydrocarbon radical of 2 to about 6 carbon atoms and n is an integer of from 1 to about 10.

5. The oil-soluble product of claim 1, wherein the amine compound is an uramine of the general formula:

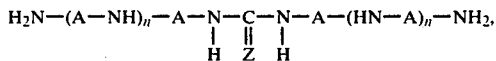

wherein A is a divalent alkyl hydrocarbon radical of 2 to about 6 carbon atoms, n is a integer of from 1 to about 10, and Z is oxygen or sulfur.

6. The oil-soluble product of claim 1, wherein the acid catalyst is sulfuric acid, the alkyl-substituted phenol is a polybutylphenol in which the polybutyl substituent has an average molecular weight of from about 500 to about 3,000 and the amine compound is ethylene diamine.

7. The oil-soluble product of claim 1, wherein the acid catalyst is sulfuric acid, the alkyl-substituted phenol is a polypropylphenol in which the polypropyl substituent has an average molecular weight of from about 500 to about 3,000, and the amine compound is pentaethylene hexamine.

8. The oil-soluble product of claim 5, wherein the uramine is formed in situ by reacting 0.5 mole pentaethylene hexamine with 0.25 mole urea.

9. A lubricant composition comprising, a major proportion of a normally liquid oleaginous lubricant, and from about 0.1% to about 10% of the oil-soluble product defined in claim 1.

10. A lubricant composition comprising, a major proportion of a normally liquid oleaginous lubricant, and from about 0.1% to about 10% of the oil-soluble product defined in claim 2.

11. A lubricant composition comprising, a major proportion of a normally liquid oleaginous lubricant, and from about 0.1% to about 10% of the oil-soluble product defined in claim 3.

12. A lubricant composition comprising, a major proportion of a normally liquid oleaginous lubricant and from about 0.1% to about 10% of the oil-soluble product defined in claim 4.

13. A lubricant composition comprising, a major proportion of a normally liquid oleaginous lubricant, and from about 0.1% to about 10% of the oil-soluble product defined in claim 5.

14. A lubricant composition comprising, a major proportion of a normally liquid oleaginous lubricant, and from about 0.1% to about 10% of the oil-soluble product defined in claim 8.

15. An addition agent concentrate for lubricating oil compositions, comprising a normally liquid lubricant containing from about 10% to about 75% of the oil-soluble product defined in claim 1.

* * * * *